US009128797B2

(12) United States Patent
Zheng et al.

(10) Patent No.: US 9,128,797 B2
(45) Date of Patent: Sep. 8, 2015

(54) METHOD AND SYSTEM FOR SOFTWARE UPGRADE

(71) Applicant: Tencent Technology (Shenzhen) Company Limited, Shenzhen (CN)

(72) Inventors: Wei Zheng, Shenzhen (CN); Chunhua Luo, Shenzhen (CN); Yuedong Weng, Shenzhen (CN); Zhiqiang He, Shenzhen (CN); Guanyan Xu, Shenzhen (CN); Cheng Guo, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 14/265,244

(22) Filed: Apr. 29, 2014

(65) Prior Publication Data
US 2014/0237462 A1    Aug. 21, 2014

Related U.S. Application Data

(63) Continuation of application No. PCT/CN2013/088744, filed on Dec. 6, 2013.

(30) Foreign Application Priority Data

Dec. 6, 2012 (CN) .......................... 2012 1 0518108

(51) Int. Cl.
G06F 9/44      (2006.01)
G06F 9/445     (2006.01)
(52) U.S. Cl.
CPC .. *G06F 8/65* (2013.01); *G06F 8/62* (2013.01); *G06F 8/68* (2013.01); *G06F 8/60* (2013.01); *G06F 8/61* (2013.01); *G06F 8/71* (2013.01)

(58) Field of Classification Search
CPC ............... G06F 8/60; G06F 8/61; G06F 8/65; G06F 8/67; G06F 8/71
See application file for complete search history.

(56) References Cited

U.S. PATENT DOCUMENTS 7,185,332 B1 *  2/2007  Waldin et al. ................. 717/170
7,543,118 B1 *  6/2009  Chen et al. .................... 711/154
(Continued)

FOREIGN PATENT DOCUMENTS

CN    101883139 A    11/2010
CN    101931647 A    12/2010
CN    102081536 A     6/2011

OTHER PUBLICATIONS

Andrew Boie, "Android Software Updates", Mar. 2015, Intel Corporation, pp. 1-39; <https://events.linuxfoundation.org/.../ABS-Android_SW_Updates>.*

(Continued)

*Primary Examiner* — Thuy Dao
*Assistant Examiner* — Ben C Wang
(74) *Attorney, Agent, or Firm* — Morgan, Lewis & Bockius LLP

(57) ABSTRACT

A method of upgrading an application installed on a mobile device is performed at a server. The method includes: determining a current version of the application installed on the mobile device and a new version of the application to be installed on the mobile device; generating a binary incremental package by comparing the current version of the application and the new version of the application using a binary file difference tool; in response to a upgrade request from the mobile device: pushing the binary incremental package to the mobile device through a wireless network; and receiving an application upgrade confirmation message from the mobile device. The mobile device is configured to reconstruct a version of the application and replace the current version of the application with the new version of the application using the reconstructed version of the application.

15 Claims, 5 Drawing Sheets

(56) References Cited

U.S. PATENT DOCUMENTS

| | | | |
|---|---|---|---|
| 7,657,886 B1* | 2/2010 | Chen et al. | 717/170 |
| 8,239,852 B2* | 8/2012 | Etchegoyen | 717/172 |
| 2006/0055951 A1* | 3/2006 | Edmonds | 358/1.13 |
| 2007/0016638 A1* | 1/2007 | Elbury et al. | 709/201 |
| 2007/0050762 A1* | 3/2007 | Chen et al. | 717/169 |
| 2007/0118617 A1* | 5/2007 | Lee et al. | 709/219 |
| 2009/0187901 A1* | 7/2009 | Kanai | 717/173 |
| 2009/0300596 A1* | 12/2009 | Tyhurst et al. | 717/173 |
| 2010/0325622 A1* | 12/2010 | Morton | 717/168 |
| 2011/0107323 A1* | 5/2011 | Hong | 717/173 |
| 2013/0019234 A1* | 1/2013 | Pardehpoosh et al. | 717/170 |
| 2013/0073672 A1* | 3/2013 | Ayed | 709/217 |
| 2014/0173588 A1* | 6/2014 | Ko | 717/173 |
| 2014/0237465 A1* | 8/2014 | Lin | 717/173 |
| 2014/0325498 A1* | 10/2014 | Sirois et al. | 717/170 |
| 2014/0372997 A1* | 12/2014 | Furushige et al. | 717/168 |
| 2014/0380295 A1* | 12/2014 | Chen et al. | 717/170 |
| 2015/0082294 A1* | 3/2015 | Tong | 717/170 |

OTHER PUBLICATIONS

Tijs van der Storm, "Continuous Release and Upgrade of Component-Based Software", Sep. 5, 2005, ACM, SCM 2005, pp. 43-57; <http://dl.acm.org/results.cfm?h=1&source_query=&&cfid=511364938&cftoken=39209020>.*

Rao et al., "An Incremental Update Framework for Efficient Retrieval from Software Libraries for Bug Localization", Oct. 14, 2013 IEEE, WCRE 2013, pp. 62-71; <http://ieeexplore.ieee.org/stamp/stamp.jsp?tp=&arnumber=6671281>.*

Tencent Tech., ISR, PCT/CN2013/088744 Mar. 13, 2014, 3 pgs.

* cited by examiner

METHOD AND SYSTEM FOR SOFTWARE UPGRADE

RELATED APPLICATIONS

This application is a continuation application of PCT Patent Application No. PCT/CN2013/088744, entitled "METHOD AND SYSTEM FOR SOFTWARE UPGRADE" filed Dec. 6, 2013, which claims priority to Chinese Patent Application No. 201210518108.0, "METHOD AND SYSTEM FOR SOFTWARE UPGRADE," filed Dec. 6, 2012, both of which are hereby incorporated by reference in their entirety.

TECHNICAL FIELD

The disclosed implementations relate to the field of computer technologies, and more particularly, to a software upgrade method and system.

BACKGROUND

With rapid development of mobile terminals, the software upgrade package of mobile terminal software becomes larger and larger; as the current domestic wireless network environment is complex, especially for a General Packet Radio Service (GPRS) network having problems such as gateway restrictions and slow network speed, it usually takes a longer time for a user to download a software upgrade package, which is prone to failure, so that mobile terminal software upgrade has a low success rate, and a high upgrade cost.

In sum, a software upgrade method which solves problems that the existing software upgrade method has a low success rate and a high upgrade cost is needed.

SUMMARY

In accordance with some embodiments, a method of upgrading an application installed on a mobile device is performed at a server, the method including: determining a current version of the application installed on the mobile device and a new version of the application to be installed on the mobile device; generating a binary incremental package by comparing the current version of the application and the new version of the application using a binary file difference tool, wherein the binary incremental package includes one or more parameters derived from the new version of the application; in response to a upgrade request from the mobile device: pushing the binary incremental package to the mobile device through a wireless network; and receiving an application upgrade confirmation message from the mobile device. The mobile device is configured to: reconstruct a version of the application by merging the current version of the application installed on the mobile device and the binary incremental package; compare the reconstructed version of the application with the one or more parameters derived from the new version of the application; and in accordance with a determination that the reconstructed version of the application matches the one or more parameters derived from the new version of the application: replace the current version of the application with the new version of the application using the reconstructed version of the application; and send the application upgrade confirmation message to the server.

In accordance with some embodiments, a computer system of upgrading an application installed on a mobile device comprises one or more processors, memory, and one or more programs stored in the memory to be executed by the processors, the one or more programs further including instructions for determining a current version of the application installed on the mobile device and a new version of the application to be installed on the mobile device; generating a binary incremental package by comparing the current version of the application and the new version of the application using a binary file difference tool, wherein the binary incremental package includes one or more parameters derived from the new version of the application; in response to a upgrade request from the mobile device: pushing the binary incremental package to the mobile device through a wireless network; and receiving an application upgrade confirmation message from the mobile device.

In accordance with some embodiments, a non-transitory computer readable storage medium stores one or more programs, the one or more programs comprising instructions, which when executed by a server, cause the server to: determine a current version of the application installed on the mobile device and a new version of the application to be installed on the mobile device; generate a binary incremental package by comparing the current version of the application and the new version of the application using a binary file difference tool, wherein the binary incremental package includes one or more parameters derived from the new version of the application; in response to a upgrade request from the mobile device: push the binary incremental package to the mobile device through a wireless network; and receive an application upgrade confirmation message from the mobile device.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

DETAILED DESCRIPTION

To make the technical solutions, and advantages of the present application comprehensible, the present application is further described in detail below with reference to embodiments and the accompanying drawings. It should be understood that the specific embodiments described herein are merely used for interpreting the present application, but not intended to limit the present application.

In the embodiments of the present application, a server, according to an old software package and a software upgrade package, uses a file diff tool to generate a software incremental package for a client to download, and the client downloads the software incremental package from the server; generate a synthetic upgrade package by using a package synthesis tool according to the software incremental package and the old software package stored by the client; and run the synthetic upgrade package, to upgrade client software.

Implementation of the present application is described in detail below with reference to specific embodiments.

First Embodiment

Figure 1:
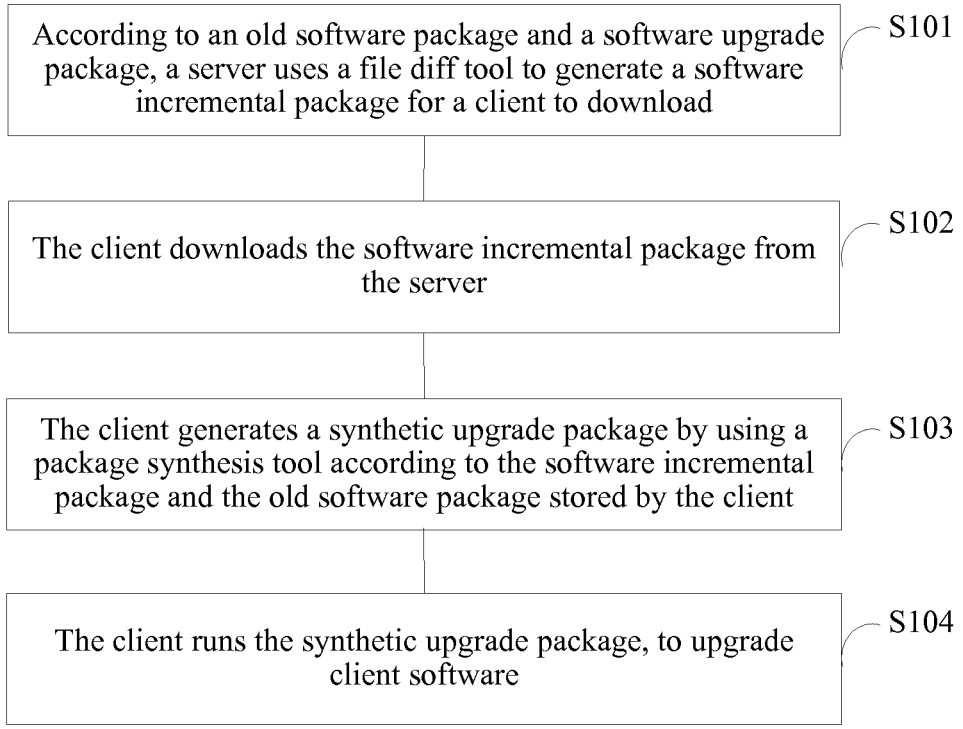
FIG. 1 is a flow chart of implementation of a software upgrade method according to a first embodiment of the present application.

FIG. 1 shows a flow of implementation of a software upgrade method according to a first embodiment of the present application, which is detailed as follows.

In Step S101, according to an old software package and a software upgrade package, a server uses a file diff tool to generate a software incremental package for a client to download.

In this embodiment, the old software package refers to a complete old-version installation package that has been released by a certain game or application, the software upgrade package refers to a complete new-version installation package of the application, the software incremental package is a file generated by using a file diff tool to compare differences between the old software package that has been released and the software upgrade package. That according to an old software package and a software upgrade package, a server uses a file diff tool to generate a software incremental package for a client to download includes the following specific steps.

In Step 11, the server uses the file diff tool to compare binary codes of the old software package and the software upgrade package, to obtain updated content of the old software package with respect to the software upgrade package.

Preferably, the file diff tool includes, but is not limited to, bsdiff and KDiff3.

In Step 12, the server generates the software incremental package with the updated content for the client to download.

In this embodiment, as the file diff tool generates the software incremental package by comparing binary files of the old software package and the software upgrade package to obtain their differences, the method is applicable to various software, and has a wide application range. Servers share the software incremental package, so that the client can download the software incremental package via a network. In the meantime, to enable upgrade of client software in different versions, the server needs to make multiple software incremental packages, with respect to software upgrade packages in other versions, of the software packages in different versions, so that when the client needs upgrade, the client only needs to download software incremental packages of the current old software package and software upgrade packages in other versions, and can be upgraded to any version. Therefore, client software upgrade is not limited to a certain version. As the software incremental package only includes newly-added or updated content of the old software package and the software upgrade package, the software incremental package is smaller as compared with the size of the software upgrade package. Generally, the software incremental package is 30%-60% smaller than the software upgrade package, and thus the client could download the software incremental package faster, which saves user traffic, increases the user downloading success rate, and reduces the upgrade cost.

In step S102, the client downloads the software incremental package from the server.

In this embodiment, the client downloads the software incremental package of the old software package and the software upgrade package of the client from the server via internet.

In step 103, the client generates a synthetic upgrade package by using a package synthesis tool according to the software incremental package and the old software package stored by the client.

In this embodiment, the client generates a synthetic upgrade package by using a package synthesis tool according to the software incremental packages and the old software package stored by the client, which specifically includes that:

The client uses the package synthesis tool to analyze binary codes of the software incremental package and the old software package stored by the client, combine the software incremental package and the old software package stored by the client, and generate the synthetic upgrade package.

Preferably, the package synthesis tool includes, but is not limited to, bspatch and KDiff3, and the client uses a package synthesis tool compatible with the file diff tool, to combine the software incremental package and the old software package and generate a software upgrade package for the client to download.

In step S104, the client runs the synthetic upgrade package, to upgrade client software.

In this embodiment, the client runs the synthetic upgrade package, where corresponding files of the software upgrade package replace corresponding files of the old software package, to upgrade the client software.

To describe the software upgrade flow more clearly, the software upgrade flow is introduced by taking upgrade of the game of Fight the Landlord as an example, a mobile terminal has been installed with an old software package, Fight the Landlord V1.0, when development of a software upgrade package of Fight the Landlord, Fight the Landlord V2.0, is completed, the version of Fight the Landlord V2.0 is uploaded to a server, the server, according to Fight the Landlord V1.0 and Fight the Landlord V2.0, uses bsdiff to obtain a software incremental package, and shares the software incremental package, so that a client could download the software incremental package. The client downloads the software incremental package from the server, the client uses a package synthesis tool bspatch to combine the software incremental package and the software upgrade package that the client has already had, Fight the Landlord V1.0, to generate a software upgrade package Fight the Landlord V2.0, and upon installation of Fight the Landlord V2.0, Fight the Landlord of the client is upgraded to the version 2.0. If Fight the Landlord has multiple versions, from Fight the Landlord V1.0 to the latest Fight the Landlord V5.0, the server only needs to make software incremental packages between the software of Fight the Landlord in different versions, and the requirements of upgrade of clients having different versions to any higher version can be met.

According to this embodiment, it is only required to download a software incremental package including updated content when an application or a game of a client is upgraded, which has a less quantity of downloading when compared with that of the case of a complete software upgrade package, saves network traffic of downloading for upgrade, increases the user downloading success rate, and reduces the user upgrade cost.

Second Embodiment

Figure 2:
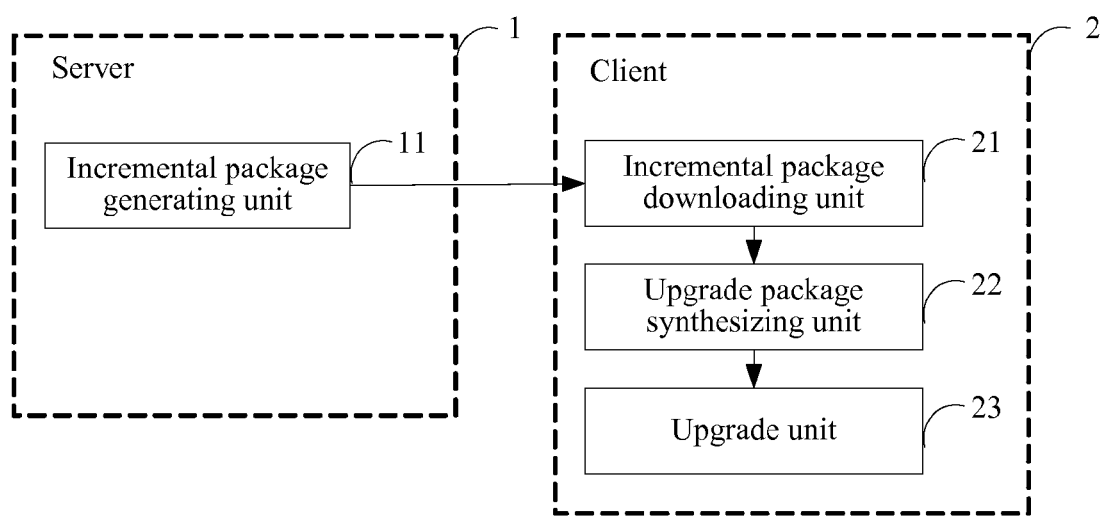
FIG. 2 is a block diagram of a specific structure of a software upgrade system according to a second embodiment of the present application.

FIG. 2 shows a block diagram of a specific structure of a software upgrade system according to a second embodiment of the present application. For ease of description, only the parts related to the embodiment of the present application are shown. In this embodiment, the software upgrade system includes: a server 1 and a client 2. The client 2 has been installed with an old software package on the server.

The server 1 includes:

an incremental package generating unit 11, configured to, according to an old software package and a software upgrade package, use a file diff tool to generate a software incremental package for a client to download.

Further, the incremental package generating unit 11 is specifically configured to use the file diff tool to compare binary codes of the old software package and the software upgrade package, and obtain updated content of the old software package with respect to the software upgrade package; and generate a software incremental package with the updated content for the client to download.

The client 2 includes:

an incremental package downloading unit 21, configured to download the software incremental package from the server;

an upgrade package synthesizing unit 22, configured to generate a synthetic upgrade package by using a package synthesis tool according to the software incremental package and the old software package stored by the client; and an upgrade unit 23, configured to run the synthetic upgrade package, to upgrade client software.

Further, the upgrade package synthesizing unit 22 is specifically configured to use the package synthesis tool to analyze binary codes of the software incremental package and the old software package stored by the client, combine the software incremental package and the old software package stored by the client, and generate the synthetic upgrade package.

The software upgrade system provided in the embodiment of the present application can be applied to the corresponding first embodiment of the method. For details, reference may be made to the description in the first embodiment, which are not repeated herein.

Figure 3:
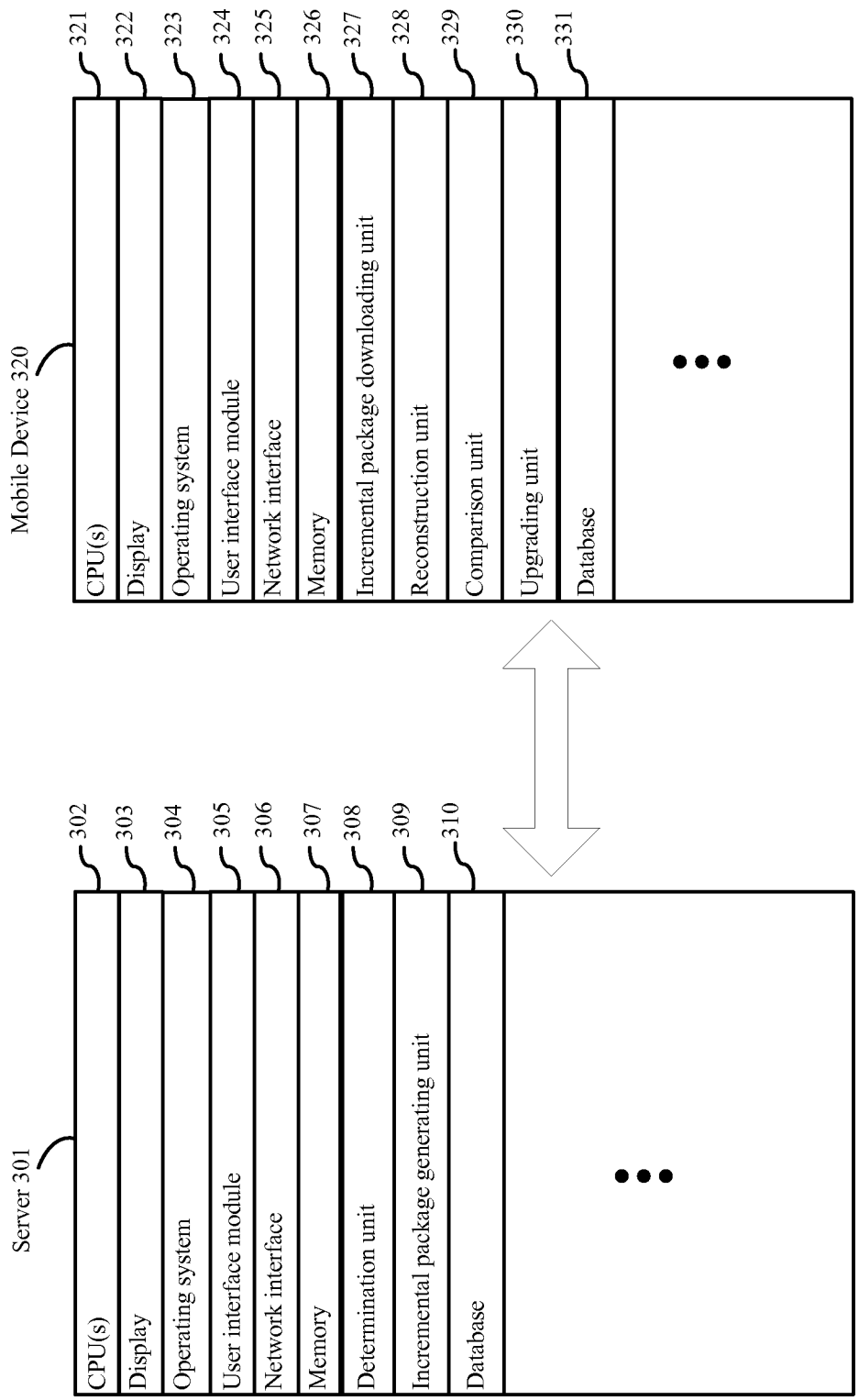
FIG. 3 is a computer diagram of the software upgrade system according to some embodiment of the present application.

FIG. 3 is a computer diagram of the software upgrade system according to some embodiment of the present application. The software upgrade system comprises a server 301 and a mobile device 320. The server 301 includes CPU(s) 302, a display 303, an operating system 304, a user interface module 305, a network interface 306, and a memory 307, the memory 307 further including a determination unit 308, an incremental package generating unit 309, and a database 310. The mobile device 320 includes CPU(s) 321, a display 322, an operating system 323, a user interface module 324, a network interface 325, and a memory 326, the memory 326 further including an incremental package downloading unit 327, a reconstruction unit 328, a comparison unit 329, an upgrading unit 330, and a database 331. In some embodiments, the memory 307 or 326, or alternately the non-volatile memory device(s) within memory 307 or 326, comprises a non-transitory computer readable storage medium.

Figure 4:
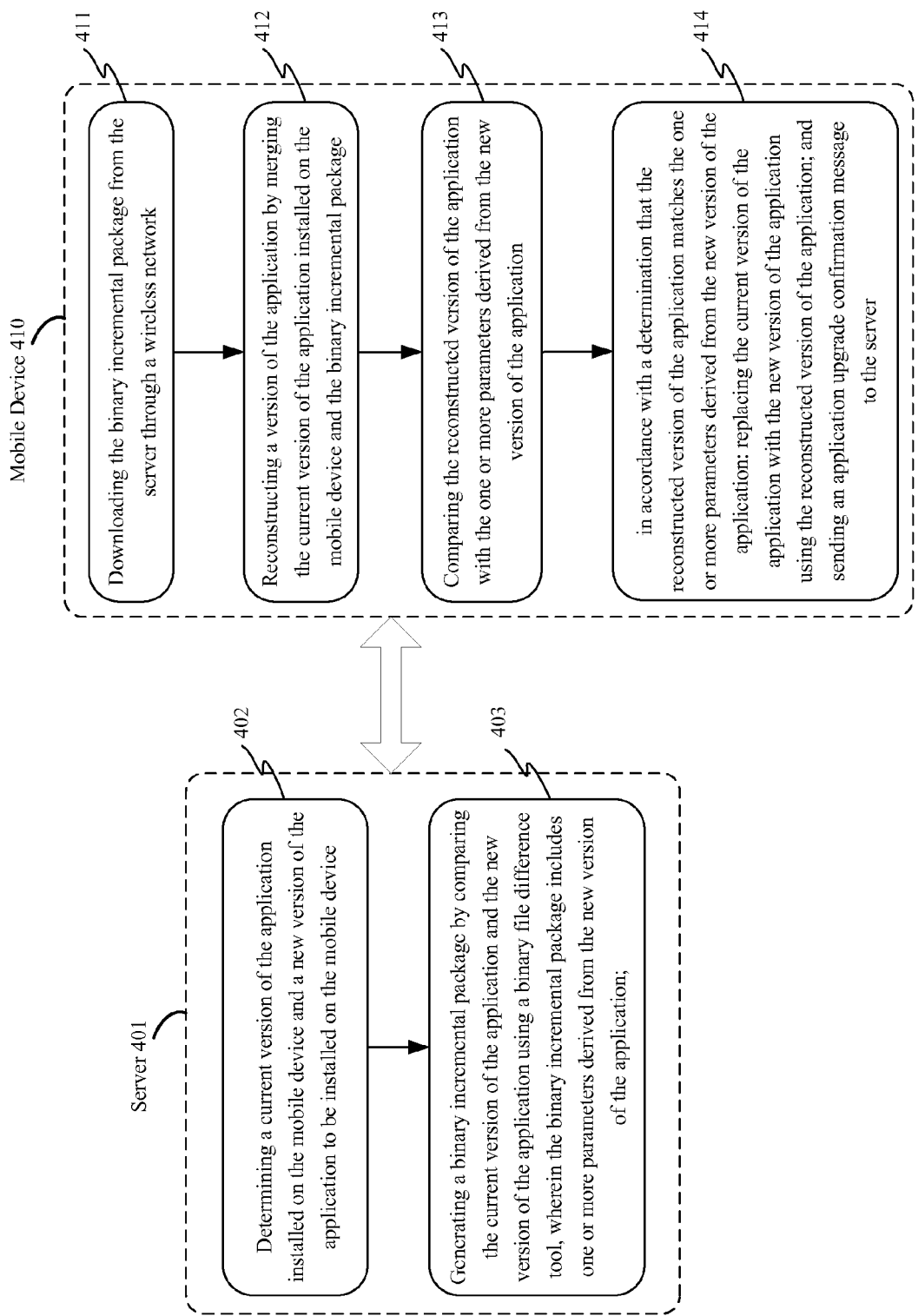
FIG. 4 is a flow chart of the the software upgrade method according to some embodiment of the present application.

FIG. 4 is a flow chart of the the software upgrade method according to some embodiment of the present application. At the server 401, the software upgrading method includes determining a current version of the application installed on the mobile device 402 and a new version of the application to be installed on the mobile device; and generating a binary incremental package by comparing the current version of the application and the new version of the application using a binary file difference tool, wherein the binary incremental package includes one or more parameters derived from the new version of the application 403. At the mobile device 410, the software upgrading method includes downloading the binary incremental package from the server through a wireless network 411; reconstructing a version of the application by merging the current version of the application installed on the mobile device and the binary incremental package 412; comparing the reconstructed version of the application with the one or more parameters derived from the new version of the application 413; and in accordance with a determination that the reconstructed version of the application matches the one or more parameters derived from the new version of the application: replacing the current version of the application with the new version of the application using the reconstructed version of the application; and sending an application upgrade confirmation message to the server 414. In some embodiments, the one or more parameters derived from the new version of the application 413 include a binary string, a timestamp, and a version number of the new version. For example, the binary string is an assembly of binary bits at predefined locations of the application, which vary from one version to another version.

Figure 5:
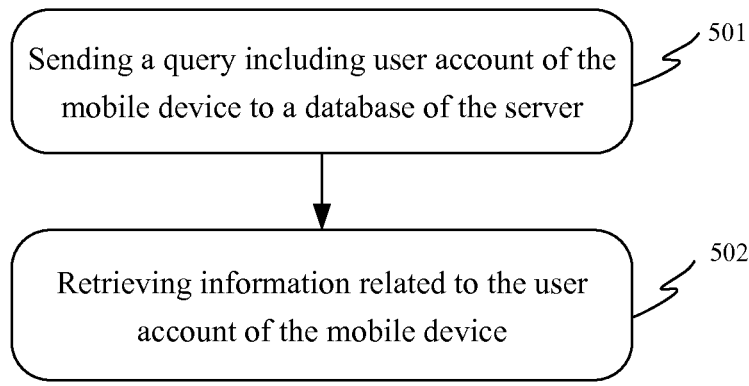
FIG. 5 is yet another flow chart of the the software upgrade method according to some embodiment of the present application.

FIG. 5 is yet another flow chart of the the software upgrade method according to some embodiment of the present application. The software upgrade method according to some embodiment further includes sending a query including user account of the mobile device to a database of the server 501; and retrieving information related to the user account of the mobile device 502. In some other embodiments, the query is submitted to the mobile device through the wireless network if the database does not have the version information of the application. The mobile device 502, in response to the query, identifies the version information in its memory and returns it to the server 501 through the wireless network.

Figure 6:
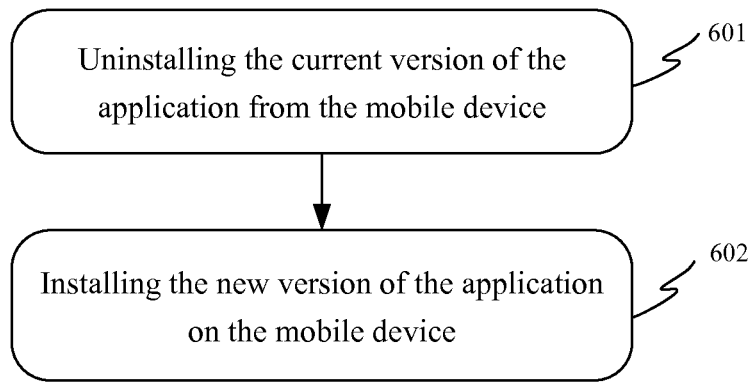
FIG. 6 is is yet another flow chart of the the software upgrade method according to some embodiment of the present application.

FIG. 6 is is yet another flow chart of the the software upgrade method according to some embodiment of the present application. The software upgrade method according to some embodiment further includes uninstalling the current version of the application from the mobile device 601, and installing the new version of the application on the mobile device 602.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

We claim:

1. A method of upgrading an application installed on a mobile device, comprising:
at a computer server having one or more processors and memory for storing programs to be executed by the one or more processors:
determining a current version of the application installed on the mobile device and a new version of the application to be installed on the mobile device;
generating a binary incremental package by comparing the current version of the application and the new version of the application using a binary file difference tool, wherein the binary incremental package includes one or more parameters derived from the new version of the application, wherein at least one of the one or more parameters is dynamically determined;
in response to a upgrade request from the mobile device:
pushing the binary incremental package to the mobile device through a wireless network; and
receiving an application upgrade confirmation message from the mobile device,
wherein the mobile device is configured to:
reconstruct a version of the application by merging the current version of the application installed on the mobile device and the binary incremental package;
compare the reconstructed version of the application with the one or more parameters derived from the new version of the application, further including deriving a set of parameters from the reconstructed version of the application and comparing each of the derived parameters with a corresponding parameter derived from the new version of the application; and
in accordance with a determination that the reconstructed version of the application matches the one or more parameters derived from the new version of the application:
replace the current version of the application with the new version of the application using the reconstructed version of the application; and
send the application upgrade confirmation message to the server.

2. The method of claim 1, wherein the one or more parameters derived from the new version of the application include a binary string, a timestamp, and a version number.

3. The method of claim 1, further comprising:
at the computer server:
sending a query including a user account of the mobile device to a database of the server;
retrieving information related to the user account of the mobile device; and
determining the current version of the application installed on the mobile device based on the retrieved information.

4. The method of claim 1, further comprising:
at the computer server:
sending a query including a user account of the mobile device and an identifier of the application to the mobile device through the wireless network; and
retrieving the current version of the application installed on the mobile device from the mobile device through the wireless network.

5. The method of claim 1, wherein replacing the current version of the application with the new version of the application further comprises:
uninstalling the current version of the application from the mobile device, and
installing the new version of the application on the mobile device.

6. A computer system of upgrading an application installed on a mobile device, comprising:
one or more processors;
memory; and
one or more programs stored in the memory to be executed by the processors, the one or more programs further including instructions for:
determining a current version of the application installed on the mobile device and a new version of the application to be installed on the mobile device;
generating a binary incremental package by comparing the current version of the application and the new version of the application using a binary file difference tool, wherein the binary incremental package includes one or more parameters derived from the new version of the application, wherein at least one of the one or more parameters is dynamically determined;
in response to a upgrade request from the mobile device:
pushing the binary incremental package to the mobile device through a wireless network; and
receiving an application upgrade confirmation message from the mobile device,
wherein the mobile device is configured to:
reconstruct a version of the application by merging the current version of the application installed on the mobile device and the binary incremental package;
compare the reconstructed version of the application with the one or more parameters derived from the new version of the application, further including deriving a set of parameters from the reconstructed version of the application and comparing each of the derived parameters with a corresponding parameter derived from the new version of the application; and in accordance with a determination that the reconstructed version of the application matches the one or more parameters derived from the new version of the application:

replace the current version of the application with the new version of the application using the reconstructed version of the application; and send the application upgrade confirmation message to the server.

7. The system of claim 6, wherein the one or more programs further include instructions for sending a query including user account of the mobile device to a database of the server, retrieving information related to the user account of the mobile device, and determining the current version of the application installed on the mobile device based on the retrieved information.

8. The system of claim 6, wherein the one or more programs further include instructions for sending a query including a user account of the mobile device and an identifier of the application to the mobile device through the wireless network, and retrieving the current version of the application installed on the mobile device from the mobile device through the wireless network.

9. The system of claim 6, wherein the mobile device is further configured to uninstall the current version of the application from the mobile device, and install the new version of the application on the mobile device.

10. The system of claim 6, wherein the one or more parameters derived from the new version of the application include a binary string, a timestamp, and a version number.

11. A non-transitory computer readable storage medium storing one or more programs, the one or more programs comprising instructions, which when executed by a server, cause the server to:

determine a current version of the application installed on the mobile device and a new version of the application to be installed on the mobile device;

generate a binary incremental package by comparing the current version of the application and the new version of the application using a binary file difference tool, wherein the binary incremental package includes one or more parameters derived from the new version of the application, wherein at least one of the one or more parameters is dynamically determined;

in response to a upgrade request from the mobile device:

push the binary incremental package to the mobile device through a wireless network; and receive an application upgrade confirmation message from the mobile device, wherein the mobile device is configured to:

reconstruct a version of the application by merging the current version of the application installed on the mobile device and the binary incremental package;

compare the reconstructed version of the application with the one or more parameters derived from the new version of the application, further including deriving a set of parameters from the reconstructed version of the application and comparing each of the derived parameters with a corresponding parameter derived from the new version of the application; and in accordance with a determination that the reconstructed version of the application matches the one or more parameters derived from the new version of the application:

replace the current version of the application with the new version of the application using the reconstructed version of the application; and send the application upgrade confirmation message to the server.

12. The non-transitory computer readable storage medium of claim 11, wherein the one or more programs further include instructions for sending a query including user account of the mobile device to a database of the server, retrieving information related to the user account of the mobile device, and determining the current version of the application installed on the mobile device based on the retrieved information.

13. The non-transitory computer readable storage medium of claim 11, wherein the one or more programs further include instructions for sending a query including a user account of the mobile device and an identifier of the application to the mobile device through the wireless network, and retrieving the current version of the application installed on the mobile device from the mobile device through the wireless network.

14. The non-transitory computer readable storage medium of claim 11, wherein the mobile device is further configured to uninstall the current version of the application from the mobile device, and install the new version of the application on the mobile device.

15. The non-transitory computer readable storage medium of claim 11, wherein the one or more parameters derived from the new version of the application include a binary string, a timestamp, and a version number.

* * * * *